United States Patent
Furukawa

[15] 3,695,745
[45] Oct. 3, 1972

[54] LIGHT WAVE GUIDE CIRCUIT
[72] Inventor: Motoaki Furukawa, Tokyo, Japan
[73] Assignee: Nippon Electric Co., Ltd., Tokyo, Japan
[22] Filed: Jan. 18, 1970
[21] Appl. No.: 106,989

[30] Foreign Application Priority Data

Jan. 23, 1970 Japan ..................45/6652

[52] U.S. Cl. ...................350/96 WG, 350/160
[51] Int. Cl. ..................................G02b 5/14
[58] Field of Search ..............350/150, 160, 96 WG

[56] References Cited

UNITED STATES PATENTS

| | | | |
|---|---|---|---|
| 3,517,200 | 6/1970 | Kalman | 350/96 WG |
| 3,329,474 | 7/1967 | Harris et al. | 350/150 |
| 3,502,875 | 3/1970 | Ploss et al. | 350/150 |
| 3,460,884 | 8/1969 | Heller | 350/160 |
| 3,589,794 | 6/1971 | Marcatti | 350/96 WG |
| 3,584,230 | 6/1971 | Tien | 350/96 WG |
| 3,458,247 | 7/1969 | Buhrer et al. | 350/160 |
| 3,464,762 | 9/1969 | Kahng | 350/96 WG |
| 3,462,211 | 8/1969 | Nelson et al. | 350/96 WG |
| 3,320,013 | 5/1967 | Johnson | 350/96 WG |
| 3,542,536 | 11/1970 | Flam et al. | 350/96 WG |

OTHER PUBLICATIONS

W. F. Gilmore, IBM Tech. Disclosure Bulletin, Vol. 12, No. 7, December 1969, p. 922.
Kaminow & Turner, "Electrooptic Light Modulators" Applied Optics, Vol. 5, No. 10, October 1966, pp. 1612–1628.

*Primary Examiner*—Ronald L. Wibert
*Assistant Examiner*—Jeff Rothenberg
*Attorney*—Sandoe, Hopgood & Calimafde

[57] ABSTRACT

A light wave guide circuit includes a transparent body capable of exhibiting the electro-optical effect. Electrodes are formed according to a preselected pattern on at least one surface of the body such that when a voltage is applied to the electrode, a variation is produced in the index of refraction of that portion of the body lying beneath the electrode thereby forming a selective light path in the body.

8 Claims, 7 Drawing Figures

PATENTED OCT 3 1972 3,695,745

INVENTOR
Motoaki Furukawa by
Sandoe, Hopgood & Calimafde
ATTORNEYS

LIGHT WAVE GUIDE CIRCUIT

The present invention relates generally to planar light wave guide circuits such as for propagating laser light to a minute portion in a solid body and, more particularly, to a light wave guide circuit of this type which employs a body having an electro-optical effect.

In fabricating an optical circuit for an optical communication system employing a laser beam, it is the common practice to make a predetermined arrangement of optical elements such as lenses, mirrors, prisms or the like. However, these elements tend to be significantly affected by mechanical shock, heat, sound, and other environmental effects which in turn may result in the deterioration of the performance of optical communication effected by the thus fabricated optical circuit. In order to avoid the possibilities of these errors, various proposals have been made, including the integrated optical system or integrated optics proposed by S. E. Miller et al in The Bell System Technical Journal, Vol. 48, No. 7, (September 1969).

The integrated optics proposed by Miller may be described as a system including, in a transparent solid material, a light wave guide circuit which has a tubular portion having a greater refractive index than the surrounding portion. Since the dimension of the light wave guide circuit thus formed is extremely small, optical circuits capable of performing various functions can be incorporated integrally into the transparent solid material. According to an article by E. A. J. Mareatili published in the same issue of said periodical, the transparent portion of the optical circuit may be in the gaseous or liquid state in part. A metal film may be attached to one of the surfaces of the transparent portion.

It is an object of the present invention to provide a novel structure of an optical integrated circuit.

It is a more specific object of the present invention to provide an improving integrated optical system as compared to that proposed in the Miller et al. article.

According to the present invention, a miniaturized solidstate optical circuit is provided which is capable of changing the light propagating path in an elctro-optical effect body and modulating the travelling light waves with ease. The light wave guide circuit of the invention includes a plate of transparent material capable of exhibiting an electro-optical effect. Electrodes are formed on one surface of that plate according to a predetermined pattern such that when a voltage is applied to the electrodes, the refractive index of the plate beneath the electrode is varied to thereby form a selective light path in the plate.

To the accomplishment of the above and to such further objects as may hereinafter appear, the present invention relates to a light wave guide circuit substantially as defined in the appended claims and as described in the following specification taken together with the accompanying drawing in which:

Figure 1:
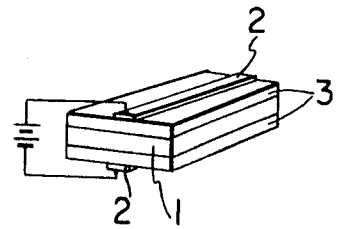
FIG. 1 illustrates the principle of the electro-optical effect utilized in the light wave guide of the present invention.

Referring to FIG. 1, there is shown a light wave guide circuit which comprises a transparent body 1 capable of exhibiting the electro-optical effect. Electrodes such as strip electrodes 2 are placed on the upper and lower surfaces of body 1 for applying electric fields to that portion of body 1 through which a laser light beam is to be propagated. A transparent insulator body 3 having a comparable or slightly lower refractive index than body 1 is formed on either surface of body 1 to each side of electrodes 2.

When an electric voltage is applied across the strip electrodes 2, the refractive index of body 1 directly beneath electrodes 2 is increased due to the electro-optical effect of body 1. A differential in the refractive indices between the voltage-applied and the other portions of body 1 is thus formed. In general, the mode of changing the refractive indices in response to the electro-optical effect of body 1 depends upon the kind of crystallization and the relationship between the axis of the body crystal and the direction of the applied electric field.

According to the Miller, et al., article, the dimension of the tubular portion of the light wave guide circuit depends on the difference in refractive indices. For example, when the tube section is 0.1 mm wide, the difference in the refractive indices is of the order of $10^{-4}$. If $LiTaO_3$ of 0.1 mm in thickness (on plane (001)) is used as the body 1 and a voltage of the order of several tens of volts is applied, the change in the refractive index is approximately $10^{-4}$ with respect to the polarized light having a polarization direction parallel to the electric field. Furthermore, with a crystal having a remarkable electro-optical effect, such as $Ba_2NaNb_5O_{15}$, as the body 1, the operating voltage may be lowered. The latter-mentioned element makes it possible to make the effective light conducting portion thinner.

Figure 2:
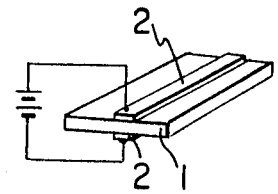
FIG. 2 is a schematic perspective illustration of a light wave guide circuit according to an embodiment of the present invention.

In the embodiment of the invention shown in FIG. 2, a pair of electrodes 2 are disposed at the opposite surfaces of the body 1. Electrodes 2 are made of a transparent film having a comparable, equal, or a slightly lower refractive index than the material of body 1. Upon the application of an electric field in the body as a result of the application of a voltage across electrodes 2, the refractive index of the portion of the body 1 lying between electrodes 2 becomes larger than the refractive index of the surrounding portion of the body. Thus, a light wave guide circuit is formed. An alternative structure of this light wave guide circuit in which one of the electrodes 2 is made of metal film is also possible.

Figure 3:
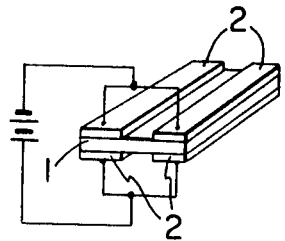
FIG. 3 is a schematic perspective illustration of a modification of the circuit of FIG. 2.

The arrangement of the light wave guide circuit shown in FIG. 3 has two pairs of electrodes 2 located at both ends and on each major surface of body 1. In this embodiment, the electric field is applied to a portion of the body in which the light wave is not allowed to travel. This is in contrast to the examples shown in FIGS. 1 and 2. More specifically, in the embodiment of FIG. 3, the light travels along the portion of body 1 where the electric field is not applied. The difference of refractive indices in the body produced as a result of the electric field may be adjusted by placing a transparent, insulating substance 3 between electrodes 2, in addition to the elements of the embodiment of FIG. 3 as illustrated by the embodiment of the invention shown in FIG. 4.

Figure 4:
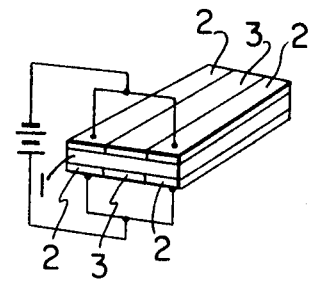
FIG. 4 is a schematic perspective illustration of a modification of the embodiment of FIG. 3.

The embodiment of FIG. 4 may be constituted by inserting a transparent, insulating body between each of the electrodes 2 and the body 1 as in the case of FIG. 1, and by applying an electric field to the body through the transparent, insulating body. It is also possible to modify the structure of FIGS. 1 and 3 to provide one of the electrodes over the entire surface at one surface of the body 1 as shown by electrode 2 in the embodiment shown in FIG. 5. Such a structure facilitates the manufacturing process when a plurality of light wave guide circuits are incorporated into a common crystalline substrate as shown in the circuit embodiment of FIG. 6.

Figure 6:
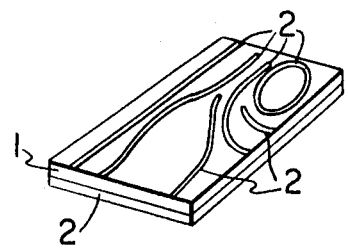
FIG 6 is a schematic perspective illustration of another embodiment of the invention.

In the circuit shown in FIG. 6, since the laser-beam travelling directions are different, the relation of the electric field is restricted. It is known that in crystals of the sphalerite type belonging to the cubic system (for example, CuCl), the application of an electric field in the direction perpendicular to the (111) plane of the crystal brings about a uniform change in the refractive index in the plane parallel to the electric field along which the light wave having the plane of polarization parallel or perpendicular to the electric field travels. Furthermore, $LiNbO_3$-type crystals can also be utilized as in the case of the above-mentioned sphalerite type crystals by applying the electric field perpendicular to the plane (001).

Although the circuit structure shown in FIG. 6 may appear to be complicated, it is easily mass produced by utilizing well-known printed circuit techniques to form the desired pattern of the upper electrodes 2. As shown in FIG. 6, when the upper electrodes 2 are formed with a plurality of light wave guide circuits, voltages applied to the electrodes may be different from one another. The voltages applied at electrodes 2 of the arrangement of FIGS. 1 and 6 are not necessarily constant. Thus, a variation of the electric field from zero to optional values in both the positive and negative directions may produce a change in the function of the light wave guide.

Figure 5:
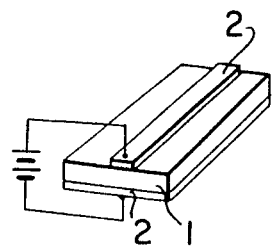
FIG. 5 is a schematic perspective illustration of a further embodiment of the invention.

More specifically, when an electric field is applied intermittently across the electrodes 2 of the device of FIG. 5, a light wave guide circuit is formed intermittently in the body 1. It follows, therefore, that this light wave guide can be employed as an intensity modulator for a light wave.

Figure 7:
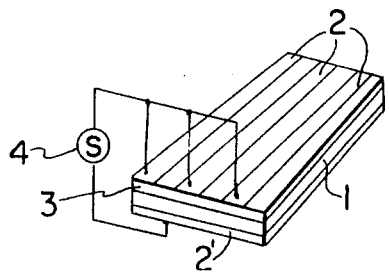
FIG. 7 is a schematic perspective illustration of yet another embodiment of the invention.

In the circuit shown in FIG. 7, tranparent, insulating body 3 is formed on at least one major surface of body 1 and an electrode 2' is formed on the other surface of the body. A plurality of electrodes 2 is formed on the one major surface in a stripe-like pattern. When a voltage from a voltage source 4 is applied between the electrodes 2 and 2', the location of the light wave guide circuits formed in the body 1 can be selected; one location is the portion of body 1 underlying the area between electrodes 2, and the other is the portion of the body disposed immediately beneath the electrodes 2.

While several embodiments of the invention have been herein specifically disclosed, it will be apparent that modifications may be made therein without departing from the spirit and scope of the invention.

I claim:

1. A light wave guide circuit comprising a plate of substantially transparent electro-optic material, a first electrode formed in a preselected pattern on at least one major surface of said plate according to the pattern of light wave guide path to be formed in said plate, a second electrode formed on an opposing surface of said plate, and means for applying a voltage across said plate through said first and second electrodes, the application of said voltage causing a change in the refractive index of the portion of said plate lying beneath said first electrode for selectively forming a light wave guide path in said plate conforming in size and shape to said first electrode pattern so long as said voltage is applied across said electrodes.

2. The light wave guide circuit of claim 1, in which said first electrode is arranged on said one major surface in the form of a plurality of parallel strips.

3. The light wave guide of claim 2, further comprising insulation material arranged on said one surface intermediate said plurality of strip electrodes.

4. The light wave guide circuit of claim 1, further comprising first and second insulation layers respectively arranged intermediate said first and second electrodes and the opposing surfaces of said plate.

5. A light wave guide circuit comprising a transparent body of electro-optic material, first and second electrodes arranged in substantial registration on opposing major surfaces of said body, one of said electrodes having a predetermined pattern, and means for applying a voltage across said first and second electrodes for varying the index of refraction of the portion of said body lying between said first and second electrodes, and for thereby creating a light wave guide path in said body conforming in size and shape to said predetermined pattern, said one of said first and second electrodes being transparent and having an index of refraction approximately equal to that of said transparent body.

6. The light wave guide circuit of claim 5, in which first and second spaced pairs of electrodes respectively including said first and second electrodes are formed on said opposing major surfaces of said body.

7. The light wave guide circuit of claim 6, further comprising a transparent insulating material on at least one major surface of said body and interposed between the pair of electrodes on said one major surface.

8. The light wave guide circuit of claim 5, in which one of said first and second electrodes covers substantially the entire area of one of said major surfaces of said body.

* * * * *

UNITED STATES PATENT OFFICE
CERTIFICATE OF CORRECTION

Patent No. 3,695,745      Dated October 3, 1972

Inventor(s) Motoaki Furukawa

It is certified that error appears in the above-identified patent and that said Letters Patent are hereby corrected as shown below:

IN THE CAPTION:

The filing date should be indicated as follows:

--[22] Filed:      Jan. 18, 1971--

Signed and sealed this 13th day of February 1973.

(SEAL)
Attest:

EDWARD M. FLETCHER, JR.            ROBERT GOTTSCHALK
Attesting Officer                  Commissioner of Patents